United States Patent [19]

Andrew et al.

[11] 4,242,384

[45] Dec. 30, 1980

[54] SPRAY COATING OF ACRYLIC RESIN COMPRISING POLYMERIC MICROPARTICLES

[75] Inventors: Malcolm S. Andrew, Hazlemere; Alan J. Backhouse, South Ascot, both of England

[73] Assignee: Imperial Chemical Industries Limited, London, England

[21] Appl. No.: 922,847

[22] Filed: Jul. 7, 1978

[30] Foreign Application Priority Data

May 17, 1978 [GB] United Kingdom ............... 20096/78

[51] Int. Cl.$^2$ ............................................. B05D 1/02
[52] U.S. Cl. .................................. 427/421; 427/388.4; 427/388.5; 427/388.2; 427/388.3; 428/463; 525/85; 525/443; 525/445
[58] Field of Search ............ 427/388 C, 388 D, 388 B, 427/388 A, 421; 260/901; 428/463, 522; 525/85, 443, 445

[56] References Cited

U.S. PATENT DOCUMENTS

| | | | |
|---|---|---|---|
| 3,832,217 | 8/1974 | Sato et al. ........................ | 427/388 A |
| 3,862,062 | 1/1975 | Harper .............................. | 427/421 X |
| 3,953,643 | 4/1976 | Cheung et al. ............... | 427/388 C X |
| 4,025,474 | 5/1977 | Porter, Jr. et al. .............. | 260/22 CQ |
| 4,061,835 | 12/1977 | Poppe et al. ................... | 427/388 C X |
| 4,064,294 | 12/1977 | Babil et al. ..................... | 427/388 C X |
| 4,115,472 | 9/1978 | Porter, Jr. et al. ...... | 260/33.6 UB X |

FOREIGN PATENT DOCUMENTS 1242054 8/1971 United Kingdom .
1319781 6/1973 United Kingdom .
1451948 10/1976 United Kingdom .

*Primary Examiner*—John D. Smith
*Assistant Examiner*—Thurman K. Page
*Attorney, Agent, or Firm*—Cushman, Darby & Cushman

[57] ABSTRACT

A process for coating a substrate, especially an automobile body, by spray application whereby improved resistance to "sagging" or "running" on application can be obtained without reduction of the thickness of film which is applied; the process is characterized by the use of a coating composition comprising a film-forming acrylic resin, a volatile organic liquid diluent, a pigment other than a metallic flake pigment, and specified polymer microparticles which are stably dispersed in the combination of the resin and the diluent.

10 Claims, No Drawings

SPRAY COATING OF ACRYLIC RESIN COMPRISING POLYMERIC MICROPARTICLES

This invention relates to the application of protective and decorative coatings to surfaces, particularly the surfaces of automobile bodies.

It is well known to formulate coating compositions, especially those for use in the automobile industry, upon acrylic resins, that is to say, polymers or copolymers of one or more alkyl esters of acrylic acid or methacrylic acid. Such compositions, however, give rise to certain difficulties, especially under the conditions of spray application as normally used in the painting of car bodies. Good flow-out of the coating after application, which is necessary in order to maximise gloss, may be hard to achieve simultaneously with the avoidance of excessive flow of the composition during the spraying operation, the latter commonly leading to the defect known as "sagging" or "running", particularly at sharp edges or corners of a substrate of complicated shape.

We have now found that these difficulties can be minimised or eliminated if the coating composition contains polymer microparticles of a specified type.

According to the present invention there is provided a process for the production of a surface coating upon a substrate which comprises (i) applying by spray to the substrate surface a composition comprising (A) a film-forming acrylic resin as herein defined; (B) a volatile organic liquid diluent in which the acrylic resin is carried; (C) polymer microparticles as hereinafter defined, in an amount of at least 3% of the aggregate weight of the film-forming resin (A) and the microparticles, which are insoluble in and stably dispersed in the combination of the acrylic resin (A) and the diluent (B); (D) a pigment, other than a metallic flake pigment, which is also dispersed in the combination of the acrylic resin and the diluent; and (ii) subsequently evaporating the volatile diluent to form a polymer film upon the surface.

The acrylic resin used in the process of the invention may be any film-forming polymer or copolymer of one or more alkyl esters of acrylic acid or methacrylic acid, optionally together with other ethylenically unsaturated monomers such as vinyl acetate, vinyl propionate, acrylonitrile, styrene or vinyl toluene. These polymers may be of either the thermoplastic type or the thermosetting, cross-linking type. Suitable acrylic or methacrylic esters for either type of polymer include methyl methacrylate, ethyl methacrylate, propyl methacrylate, butyl methacrylate, ethyl acrylate, butyl acrylate and 2-ethylhexyl acrylate. Where the polymer is required to be of the cross-linking type, suitable functional monomers to be used in addition to the latter include acrylic acid, methacrylic acid, hydroxyethyl methacrylate, 2-hydroxypropyl acrylate, 2-hydroxypropyl methacrylate, N-(alkoxymethyl)acrylamides and N-(alkoxymethyl)methacrylamides, where the alkoxy group may be, for example, a butoxy group, glycidyl acrylate and glycidyl methacrylate. The composition may in such a case contain also a cross-linking agent such as a diisocyanate, a diepoxide or, especially, a nitrogen resin, that is to say a condensate of formaldehyde with a nitrogenous compound such as urea, thiourea, melamine or benzoguanamine, or a lower alkyl ether of such a condensate in which the alkyl group contains from 1 to 4 carbon atoms. Particularly suitable cross-linking agents are melamine-formaldehyde condensates in which a substantial proportion of the methylol groups have been etherified by reaction with butanol.

For the purposes of the foregoing general definition of the invention, the cross-linking agent, where present, is considered as being a part of the film-forming polymer (A).

The composition used according to the invention may incorporate a suitable catalyst for the cross-linking reaction between the acrylic polymer and the cross-linking agent, for example an acid-reacting compound such as acid butyl phosphate, acid butyl maleate or p-toluene sulphonic acid. Alternatively the catalytic action may be supplied by the incorporation of free acid groups in the acrylic polymer, for example by the use of acrylic acid or methacrylic acid as comonomer in the preparation of the polymer.

According to one embodiment of the invention, the acrylic resin (A) is in a state of stable dispersion in the diluent liquid (B), which in such a case will be a non-solvent for the resin. Methods of preparing such polymer dispersions are well known in the art and are further referred to below in connection with the production of the polymer microparticles (C).

In another embodiment, the acrylic resin (A) is dissolved in the diluent (B); the polymer may then be prepared by solution polymerisation of the constituent monomer or monomers, in the presence of suitable catalysts or initiators where necessary. Conveniently the polymerisation may be carried out in the same organic liquid that is to provide the diluent (B), or in a liquid which is to form part of that diluent. Alternatively the resin (A) may be prepared in a separate previous operation (e.g. by aqueous emulsion polymerisation of monomer) and then dissolved in a suitable organic liquid.

In yet another embodiment, the acrylic resin (A) may be partly in dispersion and partly in solution in the diluent (B).

The volatile organic liquid constituent (B) of the composition may be any of the liquids, or mixtures of liquids, which are conventionally used as polymer solvents in coating compositions, for example aromatic hydrocarbons such as toluene and xylene and petroleum fractions of various boiling point ranges having a significant aromatic content, esters such as butyl acetate, ethylene glycol diacetate and 2-ethoxyethyl acetate, ketones such as acetone and methyl isobutyl ketone, and alcohols such as butyl alcohol. The actual liquid or mixture of liquids selected as the diluent (B) will depend upon the nature of the acrylic resin (A), according to principles which are well known in the coatings art, in order that the resin shall be soluble or insoluble in the diluent as required.

The polymer microparticles (C) present in the composition of the invention are particles of colloidal dimensions, having a diameter of from 0.01–10 microns, composed of a polymer which has a glass-liquid transition temperature greater than 0° C. and is insoluble in the combination of the acrylic resin (A) and the diluent (B), the microparticles being stably dispersed in that combination (in the sense that they do not undergo flocculation or aggregation) as a consequence of the method of their preparation. This method involves two essential stages: (i) the polymerisation of monomer, from which the microparticles are to be derived, in an inert liquid in which the resulting polymer is insoluble and under conditions such that the polymer is obtained in a state of stable dispersion, and (ii) the subsequent polymerisation, in the same inert liquid and in the presence of the microparticles formed in the first stage, of ethylenically unsaturated monomer giving rise to a second acrylic polymer which is compatible with the film-forming acrylic resin (A) and is soluble in the combination of polymer (A) and diluent (B). This second acrylic polymer, which for convenience will be referred to here as the "auxiliary" polymer, may be either soluble or insoluble in the inert liquid in question, depending on the monomer or monomers from which it is derived.

The insolubility of the microparticles in the combination of the acrylic resin (A) and the diluent (B) may be achieved by suitable selection of the composition of the microparticulate polymer, that is to say, the polymer may be one which is inherently insoluble in that combination, but preferably it is achieved by introducing a sufficient degree of cross-linking into a polymer which, if not cross-linked, would actually be soluble in the combination of the resin (A) and diluent (B). Where insolubility of the microparticles is achieved through cross-linking, it is preferred that the degree of cross-linking should not be greater than that necessary to render the polymer insoluble. Insolubility of the microparticles in the combination of the resin (A) and diluent (B) may be checked by means of the following test. The microparticles (1 part by weight) are shaken for 30 minutes with the diluent (B) (100 parts by weight); the suspension is then centrifuged at 17,000 r.p.m. for 30 minutes. The supernatant liquid is decanted off and the residual polymer then dried for 30 minutes at 150° C., after which its weight is compared with that of the microparticles originally taken. This test may be difficult to apply where the specific gravity of the diluent is close to or greater than that of the microparticles, but such diluents (e.g. chlorinated solvents) would not normally be used in the compositions under consideration. Where the result of this test indicates that the microparticles are acceptably insoluble in the diluent (B) alone, it can be assumed that the particles will be at least equally insoluble when the resin (A) is also present in solution in the diluent; there would be practical difficulties in carrying out the test actually in the solution of the resin (A) in diluent (B). Where the resin (A) is in a state of dispersion in the diluent (B), its presence will not normally have any influence on the degree of insolubility of the microparticles.

The microparticulate polymer may be of various types. It may, for example, be an acrylic addition polymer, derived from one or more of the same monomers as have been described above in connection with the acrylic resin constituent (A). Where it is desired that such a polymer should be cross-linked, this may be achieved by either of two general methods; firstly, by including in the monomers from which the polymer is derived a minor proportion of a monomer which is polyfunctional with respect to the polymerisation reaction, e.g. ethylene glycol dimethacrylate or divinylbenzene; or secondly, by including in those monomers minor proportions of two other monomers carrying pairs of chemical groupings which can be caused to react with one another either during or after the polymerisation reaction, such as epoxy and carboxyl (e.g. glycidyl methacrylate and methacrylic acid), anhydride and hydroxyl or isocyanate and hydroxyl. Alternatively, the microparticles may be composed of a condensation polymer, for example a polyester prepared from a polyhydric alcohol and a polycarboxylic acid. Suitable polyhydric alcohols include ethylene glycol, propylene glycol, butylene glycol, 1:6-hexylene glycol, neopentyl glycol, diethylene glycol, triethylene glycol, tetraethylene glycol, glycerol, trimethylolpropane, trimethylolethane, pentaerythritol, dipentaerythritol, tripentaerythritol, hexane triol, oligomers of styrene and allyl alcohol (for example that sold by Monsanto Chemical Company under the designation RJ 100) and the condensation products of trimethylolpropane with ethylene oxide or propylene oxide (such as the products known commercially as "Niax" triols). Suitable polycarboxylic acids include succinic acid (or its anhydride), adipic acid, azelaic acid, sebacic acid, maleic acid (or its anhydride), fumaric acid, muconic acid, itaconic acid, phthalic acid (or its anhydride), isophthalic acid, terephthalic acid, trimellitic acid (or its anhydride) and pyromellitic acid (or its anhydride). Where it is desired that the polyester should be cross-linked, this may again be achieved by incorporating in the starting composition materials of functionality greater than two, although in this case, because of the characteristically broad distribution of molecular species formed in a condensation polymerisation, it may be difficult to ensure that all those species are in fact cross-linked.

The chemical compositions and degree of cross-linking of the microparticulate polymer are so chosen as to ensure that the polymer per se has a glass-liquid transition temperature (Tg) greater than 0° C., that is to say, under normal conditions of use of the composition which is spray-applied according to the invention, the microparticles are hard and glassy.

As already stated, it is necessary that the polymer microparticles be stably dispersed in the combination of the acrylic resin (A) and the liquid diluent. By "stably dispersed" is meant that the particles are prevented from flocculating or aggregating by means of a steric barrier around the particles, of polymer chains which are solvated by the said combination and hence are in a chain-extended configuration. In this context the term "solvated" implies that the polymer chains in question, if they were independent molecules, would be actually soluble in the combination in question; however, because the chains are in fact attached to the microparticles at one or more points along their length, the steric barrier remains permanently attached to the particles. It will be understood that the stabilising polymer chains to be used in any particular instance will be selected with reference to the nature of the liquid diluent and film-forming acrylic resin concerned. In general terms this means that the chains will be of a degree of polarity similar to that of the diluent and film-forming resin, so that the combination of the latter will be inherently a solvent for the polymer of which the chains are composed. Since, in the automobile finishes to which the present invention is primarily directed, the liquid diluent will conventionally be of a relatively high degree of polarity (containing, for example, a substantial proportion of "strong" ester and ketone solvents) it follows that the stabilising chains on the microparticles will usually require to be of a composition such that they are inherently soluble in that type of liquid.

The mode of anchoring of the stabilising chains to the microparticles is conveniently discussed in connection with methods of making the particles, as follows.

The polymer microparticles may be produced in various ways. Preferably they are produced by a process of dispersion polymerisation of monomers, in an organic liquid in which the resulting polymer is insoluble, in the presence of an amphipathic steric stabilising agent. Suitable processes of dispersion polymerisation are well known and extensively described in the literature. Thus, so far as the dispersion polymerisation of ethylenically unsaturated monomers such as acrylic or methacrylic acid esters, vinyl esters and styrene or its derivatives is concerned, the procedure is basically one of polymerising the monomers in an inert liquid in which the monomers are soluble but the resulting polymer is not soluble, in the presence dissolved in the liquid of an amphipahtic stabilising agent or of a polymeric precursor which, by copolymerisation or grafting with a portion of the monomers, can give rise in situ to such a stabilising agent. Reference may be made, for example, to British Pat. Specifications Nos. 941,305; 1,052,241; 1,122,397 and 1,231,614 for a general description of the principles involved, as well as to "Dispersion Polymerisation in Organic Media", ed. K. E. J. Barrett (John Wiley and Sons, 1975).

The choice of suitable unsaturated monomers for the production of microparticles having the required Tg and other characteristics will present no difficulty to those skilled in the polymer art. Amongst suitable monomers, there may be mentioned methyl methacrylate, styrene and vinyl acetate, the homopolymers of which have Tg values of about 105°, 100° and 32° C. respectively. Where a lower Tg than that of the homopolymer is desired, these "hard" monomers may be copolymerised with a suitably chosen proportion of a "soft" monomer, such as ethyl acrylate, butyl acrylate, 2-ethylhexyl acrylate or butyl methacrylate. In the case where the microparticle polymer is produced by a process of dispersion polymerisation of the monomer or monomers in an organic medium, there may be a limit imposed upon the proportion of "soft" monomers which can be included by the need to ensure that the resulting copolymer is not too soluble, even in organic liquids of low polarity such as hydrocarbons, for the formation of a stable dispersion of the microparticles to take place. The skilled person will, however, readily be able to find, if necessary with the aid of simple experimentation, suitable monomer compositions to satisfy the given requirements.

The production specifically of dispersion of cross-linked addition polymer particles can be achieved by including, in the monomers selected, pairs of monomers containing (in addition to the polymerisable unsaturated groups) groups capable of entering into chemical reaction with each other; for example, the epoxide and carboxyl groups contained in glycidyl methacrylate and methacrylic acid. By following the procedure particularly described in British Pat. Specifications Nos. 1,095,288 and 1,156,012, for example, particles are obtained in which there are present such complementary groups which, although not at that stage co-reacted, can be caused to co-react and so form crosslinks by subsequently heating the dispersion to a suitably elevated temperature. Cross-linked addition polymers may also be prepared in dispersion by including in the monomers undergoing dispersion polymerisation a minor proportion of a monomer which is difunctional with respect to the polymerisation reaction, such as ethyleneglycol dimethacrylate or divinylbenzene. Small proportions of comonomers incorporating carboxyl groups, e.g. acrylic acid or methacrylic acid may be included (where the microparticles are to be cross-linked, such proportions would be in excess of those used in order to achieve cross-linking by reaction with a co-reactive monomer such as glycidyl methacrylate). Conversely, small (additional) proportions of an epoxide monomer, e.g. glycidyl methacrylate, may be included. Other functional monomers, such as hydroxyethyl acrylate or acrylamide, may also be included in minor proportions in the monomers from which the microparticles are to be derived.

The production of dispersions of condensation polymers is described, for example, in British Pat. Specifications Nos. 1,373,531; 1,403,794 and 1,419,199, and methods of obtaining cross-linked polymer particles are included in these descriptions. The general principles involved here are the same as those referred to above in connection with addition polymer dispersions, but there is a difference of detail arising from the commonly more highly polar nature of the monomers or starting materials from which condensation polymers are derived. This is, namely, that the monomers in question are usually insoluble in the inert liquid in which the polymerisation is to be carried out. Accordingly the first step in the dispersion polymerisation of the monomers is to bring them into a state of colloidal dispersion in the inert liquid, either as liquid or as solid particles. In the second step, polymerisation of the monomers takes place within those same particles. An amphipathic stabilising agent is required in each stage, firstly in order to stabilise the particles of monomer and secondly in order to stabilise the particles of polymer formed, but in suitable cases a single stabilising agent can be found which will perform both these functions. In place of using a preformed amphipathic stabilising agent in this process, there may be employed instead a suitable polymeric precursor which, by copolymerisation or grafting with a portion of the monomers being polymerised, can give rise to such a stabilising agent in situ. Reference may be made in this connection to British Pat. Application No. 19487/76.

Suitable monomeric starting materials for preparing condensation polymer microparticles are those which are well known for use in making such polymers by melt or solution polymerisation techniques. For example, in the case of polyester microparticles, suitable materials in general are the polyhydric alcohols and polycarboxylic acids, and here, as with the polymers of the addition type discussed above, it will be evident to the skilled person which particular reactants are to be selected in order to produce a microparticulate polymer having the requisite Tg and other characteristics.

It will, of course, be understood that, in the case of both polyester and polyamide microparticles, the mixture to be polymerised must incorporate some proportion of a starting monomer which has a functionality greater than two, where it is desired that the microparticles should be cross-linked.

In all the above-described dispersion polymerisation processes, the amphipathic steric stabilising agent is a substance the molecule of which contains a polymeric component which is solvatable by the liquid in which the dispersion is made and another component which is relatively non-solvatable by that liquid and is capable of associating with the polymer particles produced. Such a stabilising agent will be soluble as a whole in the dispersion liquid, but the resulting solution will usually contain both individual molecules and micellar aggregates of molecules, in equilibrium with each other. The type of stabilising agent preferred for use in the invention is a block or graft copolymer containing two types of polymeric component: one type consists, as stated above, of polymer chains which are solvatable by the dispersion liquid and the other type consists of polymer chains of different polarity from the first type which accordingly are not solvatable by that liquid and are capable of becoming anchored to the polymer microparticles. A particularly useful form of such a stabilising agent is a graft copolymer comprising a polymer backbone, which is the non-solvatable or "anchor" component, and a plurality of solvatable polymer chains pendant from the backbone. Specific examples of such graft copolymers include those in which the backbone is an acrylic polymer chain, derived predominantly from methyl methacrylate, and the pendant chains are residues of poly-(12-hydroxystearic acid) which are readily solvatable by an aliphatic hydrocarbon medium. These copolymers may be made, for example, by first reacting poly-(12-hydroxystearic acid) with glycidyl acrylate or glycidyl methacrylate, whereby the terminal - COOH group in the polymeric acid is converted to an ester derivative containing a polymerisable unsaturated grouping, and then copolymerising that derivative with methyl methacrylate, optionally together with minor proportions of other copolymeric monomers. By employing acrylic acid or methacrylic acid as such minor comonomers, it is possible to introduce carboxyl groups into the backbone chain of the graft copolymer with beneficial results inasmuch as the backbone is thereby rendered more polar than it is if composed of methyl methacrylate units alone. This increased polarity causes the backbone to be even less solvatable by a non-polar diluent such as an aliphatic hydrocarbon, and in consequence enhances the force whereby it becomes anchored to the microparticle.

The foregoing patent and literature references, and the foregoing description, relating to dispersion polymerisation processes suitable for the production of the polymer microparticles are equally applicable to the production of the film-forming acrylic polymer (A), where this is to be in a state of stable dispersion in the diluent (B), except that the polymer (A) will not normally be cross-linked at this stage even though it may become cross-linked as the result of a curing operation following application of the composition to a substrate.

After formation of the polymer microparticles in dispersion in the manner just described, the acrylic auxiliary polymer is then formed by polymerisation of ethylenically unsaturated monomer in the presence of the microparticles. This further polymerisation is accomplished by feeding in a charge of suitable monomer to the same reaction mixture in which the microparticles have been produced under essentially the same conditions as were operated in the first stage, but with the differences that the monomer or monomers involved will overall be of a different composition to those used in the first stage and that the acrylic auxiliary polymer, unlike the microparticles, will not necessarily be wholly insoluble in the inert liquid in which the polymerisation is carried out.

In general, the auxiliary polymer will be required to have a composition such that it is compatible with the film-forming acrylic polymer (A); indeed, it may be identical with that polymer and, in certain circumstances as described below, even wholly replace it. The monomer or monomers from which the auxiliary polymer is to be derived will be chosen with this requirement in mind, from the range of ethylenically unsaturated monomers already described in connection with the production of the polymer (A), or other suitable monomers, as will be apparent to those skilled in the art.

On introducing the microparticles, associated with auxiliary polymer in the way described above, into the dispersion or solution of the acrylic polymer (A) in the diluent (B), part of the auxiliary polymer may be dissolved away by that more polar medium, but it is believed that a substantial proportion of the auxiliary polymer chains remain attached to the microparticles (albeit now solvated by the medium), for example by virtue of their having become entangled with the chains of the microparticle polymer during their formation, or as a result of actual grafting on to those chains. Whatever the mechanism may be, the effect of the presence of the auxiliary polymer is to stabilise the microparticles in the new, more polar environment. If desired, this stability may be enhanced by ensuring that covalent linkages are developed between the chains of the auxiliary polymer and those of the microparticles. This may be done, for example, by including an unsaturated carboxylic acid in the monomers from which the auxiliary polymer is derived. The carboxyl groups so introduced are able to react with epoxide groups, present in the microparticle polymer as the result of the use of a slight excess of the latter groups for the purpose of cross-linking that polymer by reaction with carboxyl groups in the manner described above. The incorporation of the microparticles, associated with auxiliary polymer, into the composition of the invention may be achieved either by blending the dispersion obtained after formation of the auxiliary polymer directly with the dispersion or solution of the film-forming acrylic polymer (A) in the diluent (B), or, in the extreme case, by simply adding to the microparticle dispersion sufficient strong solvent to dissolve away enough of the acrylic auxiliary polymer from the microparticles to provide itself the whole of the film-forming polymer constituent (A), whilst still leaving a residue of the auxiliary polymer associated with the microparticles which will ensure their continued stabilisation. Another possibility is to separate the microparticles from the dispersion in which they are made, for example by centrifuging, filtration or spray-drying, and then to blend the microparticles with the dispersion or solution of the film-forming acrylic polymer (A). It will be understood from the foregoing description that, for the purposes of the definition of the invention hereinbefore given, the film-forming resin (A) is considered to comprise that portion of the auxiliary polymer which is dissolved away from the microparticles when the latter are incorporated into the coating composition.

As an alternative to the use in organic media of dispersion polymerisation methods, the polymer microparticles may, for example, be produced by aqueous emulsion polymerisation of suitable unsaturated monomers, using procedures well known in the art. The microparticles are then obtained in the form of a charge-stabilised dispersion, from which the particles themselves can be separated, e.g. by spray drying. For incorporation into the coating composition, the microparticles are then re-dispersed in the solution or dispersion in the diluent of the film-forming polymer, preferably by methods imparting high shear to the mixture such as pug milling or triple roll milling, in an analagous fashion to the dispersion of a pigment. By further analogy to pigment dispersion, the requisite steric stability of the microparticles may then be achieved simply as a result of an innate tendency of the film-forming polymer (especially where it is soluble in, and therefore solvated by, the diluent) to associate with the particles, for example through the interaction of polar groups present in the film-forming polymer and in the microparticle respectively. In producing the microparticles by aqueous emulsion polymerisation, some difunctional unsaturated compounds may be included in the polymerising monomers in order to give rise to a cross-linked polymer which will be insoluble in the solution or dispersion of the film-forming acrylic polymer (A) in the diluent (B), whatever the nature of the latter. Here again, as in the case of microparticles made by dispersion polymerisation in inorganic media, it is essential to continue the emulsion polymerisation with a second feed of monomers which does not include any difunctional (i.e. cross-linking) material and which gives rise to an acrylic polymer which is compatible with the polymer (A) and is soluble in the solution or dispersion of polymer (A) in diluent (B), in other words to associate with the microparticles an auxiliary polymer having the same function as that previously described.

The polymer microparticles (C) used in the process of the invention are preferably present in proportions of from 2% to 30% of the aggregate weight of the film-forming acrylic resin (A) and the microparticles. More preferably, the proportion of microparticles is from 5% to 20% of that aggregate weight. The precise proportion which is used will depend upon the particular application properties which it is desired that the coating composition should possess. For the purposes of this definition, the term "polymer microparticles" is to be understood as referring to the microparticles proper together with that part of the auxiliary polymer associated therewith which cannot be dissolved away from the particles by the diluent (B), under the conditions of the insolubility test described above.

The compositions used in the process of the invention incorporate, in addition to the acrylic resin (A), the diluent (B) and the polymer microparticles (C), pigments (D) as conventionally used in the coatings art, other than metallic flake pigments. Such pigments may range in particle size from 1 to 50 microns and may be inorganic in nature, for example titanium dioxide, iron oxide, chromium oxide, lead chromate or carbon black, or organic in nature, for example phthalocyanine blue, phthalocyanine green, carbazole violet, anthrapyrimidine yellow, flavanthrone yellow, isoindoline yellow, indanthrone blue, quinacridone violet and perylene red. Any of these pigments may be present in the compositions in a proportion of from 2% to 50% of the aggregate weight of the acrylic resin (A) and the microparticles (C). The term "pigment" is here meant to embrace also conventional fillers and extenders, such as talc or kaolin. Such pigments may be incorporated into the compositions with the aid of known dispersants, for example with the aid of an acrylic polymer which is compatible with the acrylic film-forming polymer (A). Any such polymeric dispersant is also considered to be part of the film-forming constituent (A).

If desired, the compositions may additionally incorporate other known additives, for example viscosity modifiers such as bentone or cellulose acetate butyrate.

In the case where the film-forming acrylic polymer (A) is of the thermosetting or cross-linking type, there may, as already stated, be incorporated in the composition used according to the invention a cross-linking agent. The proportion of cross-linking agent to cross-linkable acrylic polymer in the composition may vary widely, but in general a ratio of from 50:50 to 90:10 by weight of polymer to cross-linking agent is satisfactory. The precise proportion to be employed depends upon the properties required in the final film, but a preferred range affording a good balance of properties is from 60:40 to 85:15 by weight of polymer to cross-linking agent. Where it is of particular importance that the film should exhibit good resistance towards acid corrosion induced by severe atmospheric pollution, an especially preferred range of ratios of polymer to cross-linking agent is from 70:30 to 85:15 by weight.

As already indicated, the composition may also incorporate a suitable catalyst for the cross-linking reaction, for example an acid-reacting compound, or the film-forming acrylic polymer (A) of the composition may be arranged to contain free acid groups.

The coating compositions may be applied to a substrate according to the invention by any of the known spraying procedures, such as compressed air spraying, electrostatic spraying, hot spraying and airless spraying, and either manual or automatic methods are suitable. By these procedures there can be achieved an improvement of 15-20% in the thickness of paint which can be applied before sagging occurs, without the loss of gloss, poor appearance or lower spray solids which result from attempts to improve sag resistance by other methods (for example, by increasing the average molecular weight of the film-forming polymer or by including in the composition inorganic sag-control aids).

EXAMPLE (a) Preparation of Polymer Microparticles

To a vessel fitted with stirrer, thermometer, reflux condenser and provision for adding a liquid feed to the returning condensate was charged:

Aliphatic hydrocarbon (boiling range 170°-210° C.; aromatic content 5%): 12.081 parts
Hexane: 2.959 parts
Heptane: 15.821 parts The vessel and contents were purged with inert gas; the temperature of the reactants was raised to 100° C.

The following premixed ingredients were added as a single rapid addition to the refluxing solvents:

Methyl methacrylate: 0.972 parts
Methacrylic acid: 0.020 parts
Azodiisobutyronitrile: 0.077 parts
Graft copolymer stabiliser (33% solution; as described below): 0.362 parts The contents of the vessel were then held at reflux for 30 minutes to form a seed-polymer dispersion. The following ingredients were premixed and fed into the hydrocarbon returning from the condenser at a uniform rate over a period of 3 hours:

Methyl methacrylate: 18.460 parts
Methacrylic acid: 0.188 parts
Glycidyl methacrylate: 0.188 parts
Azodiisobutyronitrile: 0.247 parts
Graft copolymer stabiliser solution (as described below): 3.885 parts
Dimethylamino ethanol: 0.036 parts After completion of the feed, the reaction mixture was maintained under reflux for 3 hours, when a fine dispersion of insoluble gel microparticles was obtained. The total solids content of the dispersion was 38-40%; the content of insoluble microparticles was 26.0% and the polymer of which the microparticles were composed had a glass-liquid transition temperature of 80°-100° C.

The graft copolymer stabiliser used in the above procedure was obtained as follows. 12-Hydroxystearic acid was self-condensed to an acid value of about 31-34 mg KOH/g (corresponding to a molecular weight of 1650-1800) and then reacted with an equivalent amount of glycidyl methacrylate. The resulting unsaturated ester was copolymerised at a weight ratio of 2:1 with a mixture of methyl methacrylate and acrylic acid in the proportions of 95:5.

(b) Modification of Microparticles with Auxiliary Polymer

To a vessel fitted as described in step (a) there was charged:

Microparticle dispersion obtained in step (a): 55.296 parts
Xylene: 14.640 parts This charge was heated to recycling temperature in an inert gas atmosphere and 2.5-3.9 parts of distillate were removed until the temperature reached 115° C. The following ingredients were premixed and fed at a constant rate over a period of 3 hours to the hydrocarbon returning from the condenser:

Methyl methacrylate: 2.894 parts
Hydroxyethyl acrylate: 1.651 parts
Methacrylic acid: 0.429 parts
Butyl methacrylate: 3.197 parts
2-Ethylhexyl acrylate: 3.301 parts
Styrene: 4.946 parts
tert-Butyl perbenzoate: 0.392 parts
prim-Octyl mercaptan: 0.183 parts
Graft copolymer stabiliser solution (as described in step (a).): 1.294 parts On completion of the feed, the reaction mixture was held at recycle temperature for 2 hours, then cooled; the following solvent mixture was added:

n-Butanol: 2.944 parts
Butyl acetate: 8.833 parts

The composition thus obtained had a total solids content of 40%; the content of insoluble gel microparticles was 23%.

(c) Preparation of Coating Compositions
(i) White compositions of high pigment content The following series of ingredients identified in columns 1 and II respectively were blended:

|  | I | II |
| --- | --- | --- |
| Butylated melamine formaldehyde resin (65% solution in butanol) | 10.97 | 10.97 parts |
| Titanium dioxide millbase (68.7% Titanium dioxide) | 29.19 | 29.19 parts |
| Thermosetting acrylic copolymer resin solution (65% solution in xylene) | 30.09 | 22.62 parts |
| Modified microparticle dispersion from step (b) | — | 12.15 parts |
| Flow-promoting polymer (10% solution in xylene) | 0.80 | 0.80 parts |
| Dipentene | 6.00 | 6.00 parts |

The white paints thus obtained had the following characteristics:

| Viscosity (B.S. B4 Cup at 25° C.) | 61 seconds | 44 seconds |
| --- | --- | --- |
| Non volatile content | 64% | 61% |

The acrylic copolymer resin had the composition: Styrene 30 parts, methyl methacrylate 15 parts, butyl methacrylate 17 parts, 2-ethylhexyl acrylate 20 parts, hydroxyethyl acrylate 15 parts, methacrylic acid 3 parts. The resin had a weight average molecular weight of 6000-7000.

Primed metal panels were sprayed with each of the two compositions without further thinning so as to give a "wedge" coat of varying film thickness. Each panel was allowed to stand for 30 minutes vertically and was then stoved, again in a vertical position, for 15 minutes at 130° C.

The film thickness at which "sagging" first occurred was then determined in each case.

The panel finished with composition I sagged at a film thickness of 60-65 microns and above, but the panels finished with composition II sagged only at a film thickness of 70-75 microns and above.

This improvement in sag resistance occurred even though sample I was at a higher viscosity and contained less solvent when sprayed than sample II.

(ii) Blue compositions of low pigment content

The following series of ingredients identified in columns I and II respectively were blended:

|  | I | II |
| --- | --- | --- |
| Butylated melamine formaldehyde resin (65% solution in butanol) | 18.1 | 18.1 parts |
| Dispersion of Prussian Blue (30% in xylene) | 12.0 | 12.0 parts |
| Dispersion of Titanium Dioxide (68.7% in xylene) | 0.4 | 0.4 parts |
| Dispersion of Phthalocyanine Green (16.4% in xylene) | 0.2 | 0.2 parts |
| Thermosetting acrylic resin solution (65% solution in xylene) | 40.7 | 29.6 parts |
| Modified microparticle dispersion from step (b) | — | 18.3 parts |
| Flow-promoting polymer (10% solution in xylene) | 0.6 | 0.6 parts |
| Xylene | 8.0 | 8.0 parts |
| Dipentene | 6.0 | 6.0 parts |

The blue paints thus obtained had the following characteristics:

|  | I | II |
| --- | --- | --- |
| Viscosity (B.S.B3 Cup at 25° C.) | 91 secs. | 99 secs. |
| Non-volatile content | 51% | 46% |

The acrylic resin solution used was the same as that described for the white paint in (i) above. Panels were sprayed and stoved in an identical manner to that described in (i) above.

The panel finished with composition I sagged at a film thickness of 66 microns, whereas the panel finished with composition II sagged only at a film thickness of greater than 80 microns.

We claim:

1. A process for the production of a surface coating upon a substrate which comprises (i) applying by spray to the substrate surface a composition comprising (A) a film-forming acrylic resin which is derived from one or more alkyl esters of acrylic acid or methacrylic acid, (B) a volatile organic liquid diluent in which the polymer (A) is carried, and (C) a pigment, other than a metallic flake pigment, which is dispersed in the combination of the film-forming resin (A) and the diluent (B), and (ii) subsequently evaporating the volatile diluent to form a polymer film upon the surface, characterised in that the composition applied to the substrate further comprises (D) microparticles having a diameter of from 0.01 to 10 microns composed of a polymer which has a glass-liquid transition temperature greater than 0° C., and which are insoluble in and stably dispersed in the combination of the resin (A) and the diluent (B), the microparticles being obtained by (a) polymerisation of monomer in an inert liquid in which the resulting polymer is insoluble and under conditions such that the polymer is obtained in a state of stable dispersion and (b) subsequent polymerisation, in the same inert liquid and in the presence of the particles formed in stage (a), of ethylenically unsaturated monomer giving rise to a second acrylic polymer or copolymer which is compatible with the acrylic resin (A) and is soluble in the combination of the resin (A) and the diluent (B), and the microparticles (D) being present in an amount of at least 3% of the aggregate weight of the resin (A) and the microparticles.

2. A process according to claim 1, wherein the acrylic resin is a polymer or copolymer of one or more alkyl esters of acrylic acid or methacrylic acid, optionally together with other ethylenically unsaturated monomers.

3. A process according to claim 1 or claim 2, wherein the acrylic resin is of the thermosetting, cross-linking type and the composition contains in addition a cross-linking agent.

4. A process according to claim 1, wherein the microparticulate polymer is an acrylic polymer.

5. A process according to claim 1, wherein the microparticulate polymer is a condensation polymer.

6. A process according to claim 1, wherein the microparticles are obtained by dispersion polymerisation of monomers, in an organic liquid in which the resulting polymer is insoluble, in the presence of an amphipathic steric stabilising agent, the molecule of which contains a polymeric component which is solvatable by the liquid in which the dispersion is made and another component which is relatively non-solvatable by that liquid and is capable of associating with the polymer particles produced.

7. A process according to claim 6, wherein the amphipathic stabilising agent is a graft copolymer comprising a polymer backbone, which is the non-solvatable or "anchor" component, and a plurality of solvatable polymer chains pendant from the backbone.

8. A process according to claim 7, wherein the polymer backbone is an acrylic polymer chain derived predominantly from methyl methacrylate and the pendant chains are residues of poly (12-hydroxy-stearic acid).

9. A process according to claim 6, wherein the monomers from which the auxiliary polymer is formed are such that during their polymerisation covalent linkages are developed between the chains of the auxiliary polymer and those of the microparticles.

10. A process according to claim 1, wherein the polymer microparticles are present in a proportion of from 2% to 30% of the aggregate weight of the acrylic resin (A) and the microparticles.

* * * * *